July 9, 1940.　　　　　J. R. PELLAM　　　　　2,207,131
GRADER FOR VEGETABLES, FRUITS, OR OTHER ARTICLES
Filed Aug. 22, 1938　　　　3 Sheets-Sheet 1

INVENTOR.
John R. Pellam
BY Harold E. Stonebraker,
his ATTORNEY.

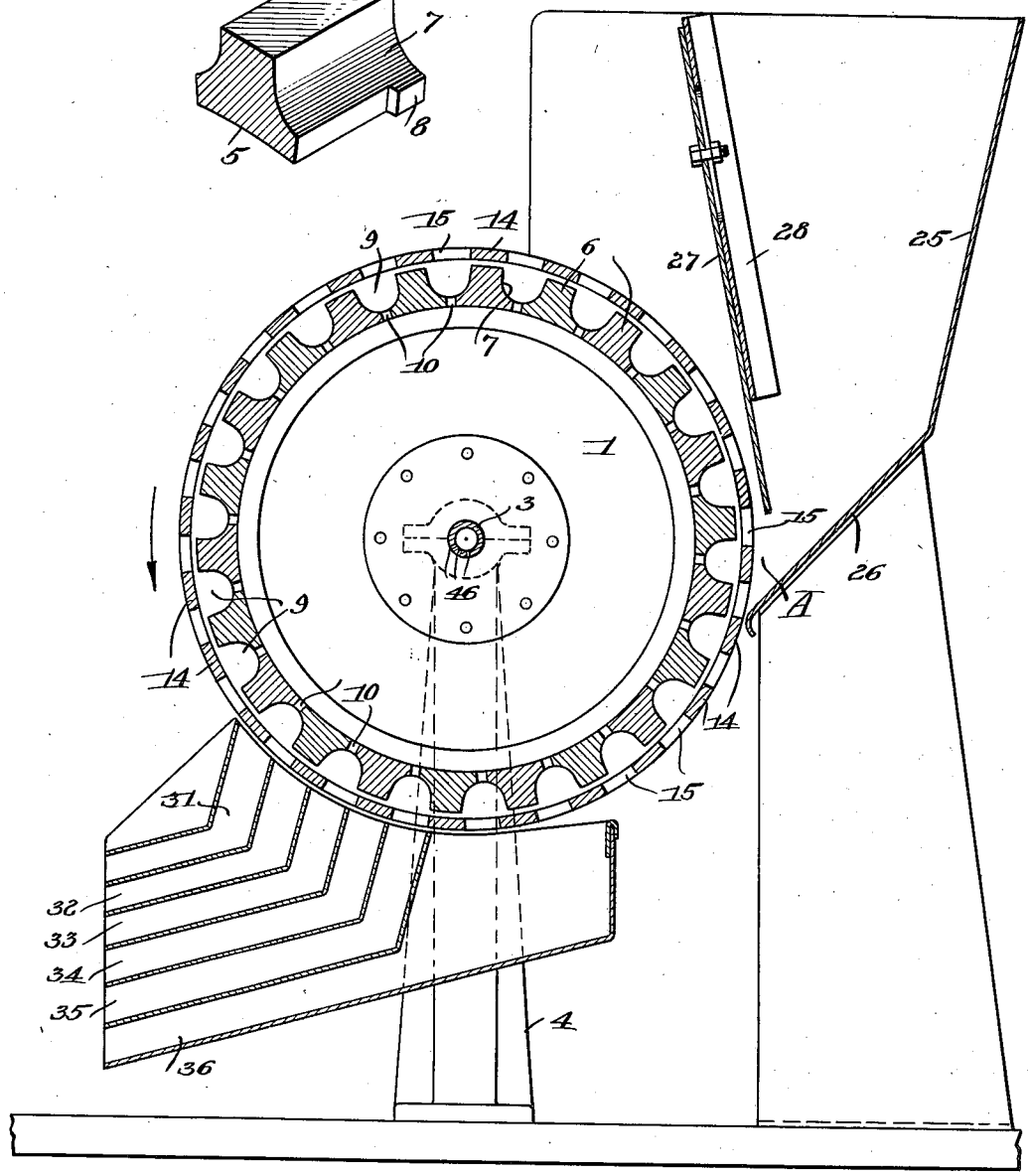

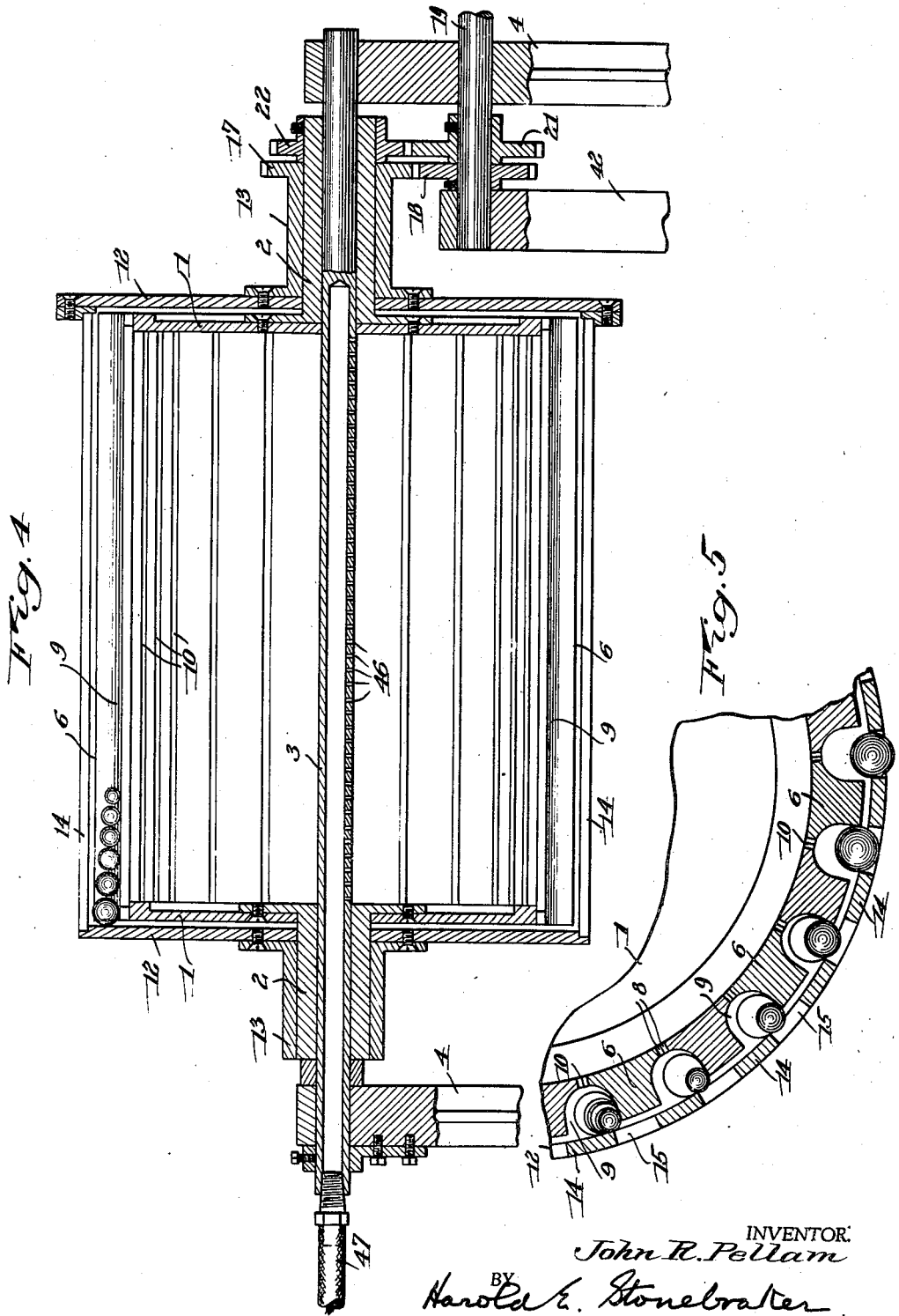

Patented July 9, 1940

2,207,131

UNITED STATES PATENT OFFICE 2,207,131

GRADER FOR VEGETABLES, FRUITS, OR OTHER ARTICLES

John R. Pellam, Newark, N. Y.

Application August 22, 1938, Serial No. 226,022

10 Claims. (Cl. 209—98)

This invention relates to a grader for vegetables, fruits, or other articles, and has for its object to provide a simple and efficient mechanism that is especially adapted for grading peas in large volumes quickly, though also operable and which can be successfully used in the grading of various vegetables such as beets, fruits such as peaches and apples, or other products having a rounded or partially rounded formation through at least one section thereof.

More particularly, the invention has for its purpose to afford a grading mechanism which cannot be overloaded and which depends for its operation upon relative movement at different speeds of two adjacently arranged supporting elements with openings in the lower or outer member through which the peas or other articles drop according to their size as said openings are gradually and increasingly uncovered, the inner or upper member cooperating by reason of its different speed to uncover said openings in the outer member progressively so as to release the smallest size peas to the largest size peas in the order mentioned and in different receiving chutes.

A further object of the invention is to provide a grading mechanism for the purposes mentioned that will occupy a minimum floor space and grade large volumes of peas quickly and accurately, accomplishing these objectives through the instrumentality of two rotating cylindrical supporting members, one within the other and traveling at different velocities so that openings or pockets in the one member gradually move past discharge openings in the other member and thereby afford outlets of progressively increasing width.

Another purpose of the invention is to afford a structure utilizing two cylindrical members rotating one within the other with pockets in one and discharge openings in the other, said members being so arranged and traveling at such relative speeds that peas can be fed from a suitable hopper to the openings in the outer member which retains them for a portion of its travel, until the position of the inner member is such as to admit them to its pockets, and upon further travel, the outer member progresses to a point relatively so as to retain the peas within the pockets of the inner member until they reach a point at which the outlet between the members is of such size as to release a pea into its particular chute.

Still a further purpose of the invention is to afford, in conjunction with a machine of this character, water ejecting mechanism which is sprayed against the peas preferably from within the inner cylinder, in such a way as to dislodge them effectively and prevent accidental sticking of the peas and consequent clogging of the machine.

Still another object of the invention is to afford a simplified and practical gear drive for actuating the cylindrical members at the relative speeds required to effect the desired operations.

An additional purpose of the invention is to provide suitable feed mechanism with facilities for adjustment, and also a series of adjustable discharge chutes positionable to vary the relative sizes to be selected.

To these and other ends, the invention consists in the combination and arrangement of parts that will appear clearly from the following description when read in conjunction with the accompanying drawings, the novel features being pointed out in the claims following the specification.

In the drawings:

Fig. 3 is a transverse vertical sectional view taken centrally of the cylindrical members;

Fig. 4 is a longitudinal vertical sectional view taken centrally;

Fig. 5 is an enlarged detail sectional view of a portion of the cylindrical members showing the progressively increasing size of the outlet openings, and Fig. 6 is a perspective view, partially broken away, showing one of the bars which form the interior cylindrical member.

Figure 1:
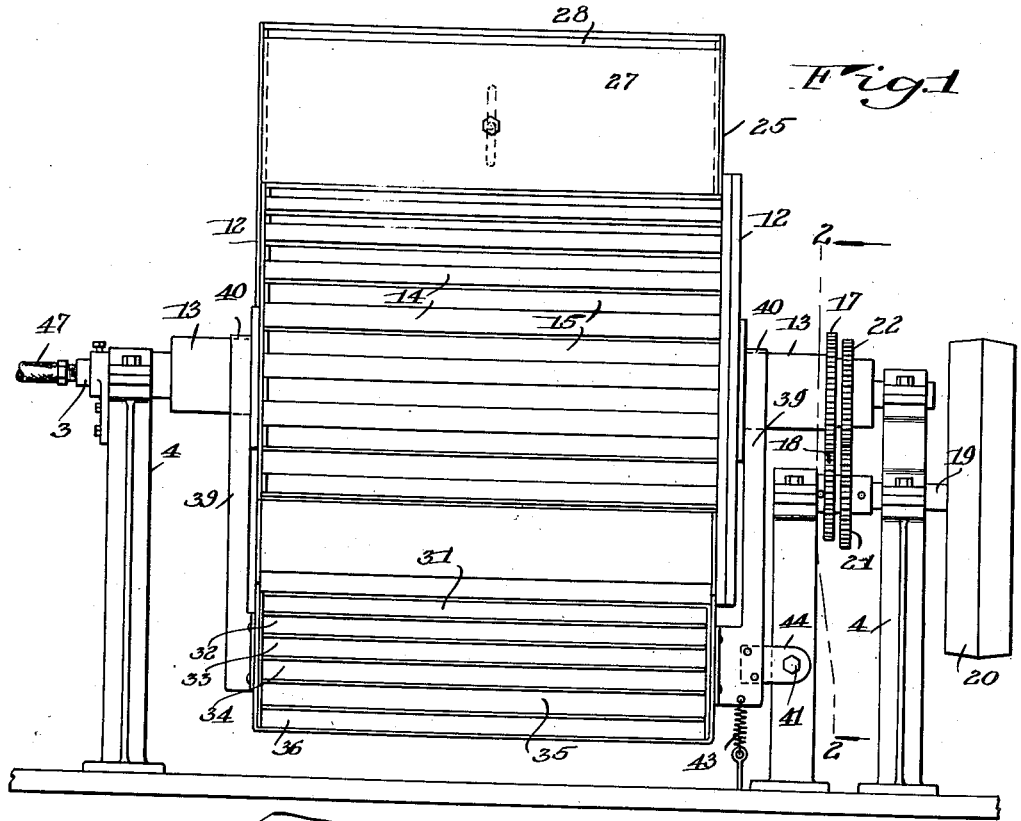
Fig. 1 is a front elevation showing one practical embodiment of the invention, as designed for operating on peas.
Figure 2:
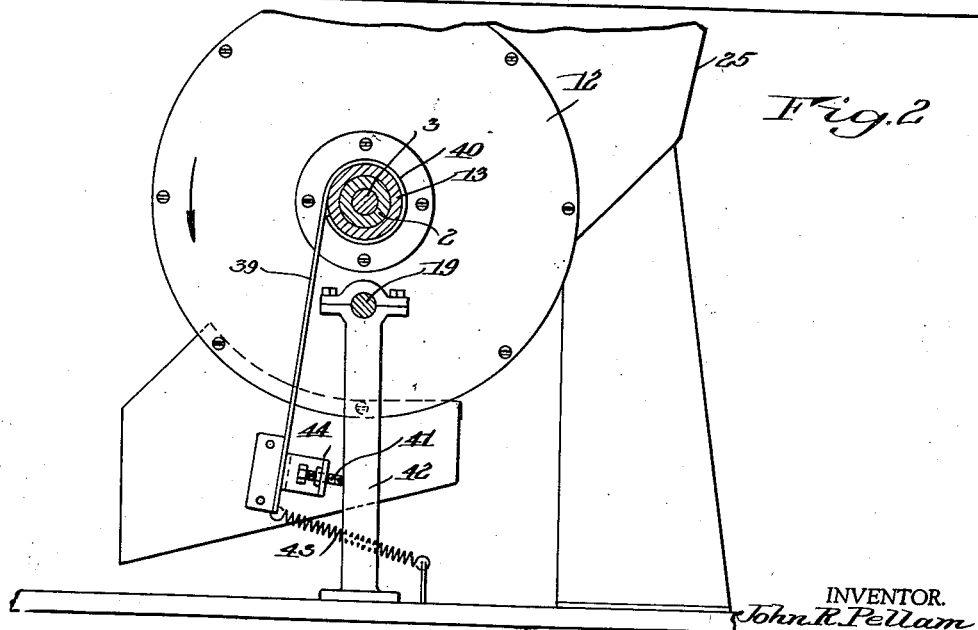
Fig. 2 is a transverse vertical sectional view on the line 2—2 of Fig. 1.

Referring more particularly to the drawings, in which like reference numerals refer to the same parts throughout the several views, the invention is herein illustrated as embodied in a machine including two concentric cylindrical members rotating one within the other at different velocities, the inner member having pockets and the outer member slots which cooperate with each other during such rotation, and in the construction shown, the inner of said cylindrical members includes the heads or end plates 1 suitably fixed to the sleeves 2 which rotate about a stationary hollow shaft 3, the latter being supported in standards 4. The inner cylindrical member is further made up of a series of longitudinal units or bars such as illustrated in Fig. 6, each consisting of an inner concave surface 5, an outer convex surface 6, and oppositely arranged sides 7 which follow sharp concave curves, while 8 designates a projection or lug at each end and on both sides of the bar adapted to abut a corresponding projection on the adjacent bar and thus afford a spacing means.

The bars or units just described are secured by welding or in any other suitable manner to the heads or end plates 1 around the periphery thereof, affording longitudinally extending pockets 9 with curved bottoms, as shown in Fig. 3, and small openings or slots 10 at the base of each pocket 9 for a purpose that will appear later.

The outer cylindrical member includes the heads or end plates 12 fixed to the sleeve 13 which are journalled upon and rotatable about the aforementioned sleeves 2, and the outer cylindrical member includes a series of bars 14 spaced from each other by the slots or openings 15 and having their ends attached in any convenient manner to the heads or end plates 12.

As will be observed from Figs. 3 and 5, the pockets 9 of the inner cylindrical member are slightly wider at their outer edges than the openings 15 of the outer cylindrical member, which is arranged concentrically and in juxtarelation to the outer periphery of the inner cylindrical member. The bars 14 of the outer cylindrical member are slightly wider than the outer surfaces 6 of the longitudinal units, which compose the inner cylindrical member. In the embodiment shown, there are twenty-four slots 15 in the outer cylindrical member and twenty-two pockets 9 in the inner cylindrical member, for a purpose that will appear presently, but it will be understood that this is merely an exemplary embodiment and that a larger number of slots and pockets may be employed in the respectve cylindrical members, although I have found that a preferable arrangement is for the outer one to have two more slots than the number of pockets in the inner cylindrical member.

The cylindrical members are rotated preferably at angular velocities which are inversely as the number of slots and pockets in the members, and to accomplish this, a sleeve 13 which is connected to the outer cylindrical member is provided with a gear 17 that is engaged and driven by a gear 18 fixed on the drive shaft 19 which carries a pulley 20 that may be driven by a belt, or power otherwise applied to the drive shaft 19. The shaft 19 also has fixed thereon a gear 21 which engages and drives a gear 22 that is fixed on the aforesaid sleeve 2 connected to the inner cylindrical member.

The gears just referred to preferably have the same sized teeth, and are so proportioned as to diameters that the inner cylindrical member turns slightly faster than the outer cylindrical member. Preferably the inner cylindrical member makes twenty-four rotations while the outer cylindrical member makes twenty-two rotations, thus causing the pockets of the inner member to travel slowly past the slots of the outer member. This result can be accomplished by providing the gear 17, which is connected to the outer cylindrical member, with forty-eight teeth, the gear 18 which engages and drives it with forty-four teeth, and the other two engaging gears with forty-six teeth each, although any other drive may be used, as long as the inner cylindrical member is operated at a sufficiently greater speed than the outer cylindrical member to effect the desired objective of gradually and progressively increasing the outlet openings at the discharge point to release the peas in the desired progression.

25 designates a hopper in which the peas or other material is fed for introduction into the machine, 26 designates the inclined bottom thereof that has its lower edge in close proximity to the outer cylindrical member, while 27 is an adjustable wall or gate secured to the stationary support 28 and movable upwardly or downwardly to regulate the amount of peas or articles that are fed to the machine.

The relative speeds of the inner and outer cylindrical members are such that at the feeding point A of the hopper, where the peas enter the machine, the outer surfaces 6 of the longitudinal units of the inner cylindrical member lie directly opposite the slots 15 of the outer cylindrical member and serve as a bottom for each slot, permitting a series of peas to enter each slot 15 and ride upwardly therein, resting against a surface 6 of the inner cylindrical member as both cylindrical members travel in an anti-clockwise direction.

It will be observed, upon reference to Fig. 3, that as a given slot in the outer cylindrical member approaches the top, the bottom of such slot is uncovered due to the faster movement of the inner cylindrical member, and the peas are thereupon permitted to drop into the pocket 9 of the inner member where they are retained upon further travel by the bars 14 in the outer member covering the pockets, as shown at the left of Fig. 3 and at the top of Fig. 5. Further faster travel of the inner member uncovers the pockets, affording progressively wider outlet openings, through which the peas may fall by gravity, as shown in Fig. 5, where the smallest size is shown falling out toward the top of the figure, and the larger peas remaining until they reach the bottommost position. The openings or slots in the outer cylindrical member are of such width as to release the largest size pea, and the pockets of the inner cylindrical member are somewhat slightly wider than the openings in the outer member to insure freedom of movement and ejecting of the peas.

Provision may be made for grading any convenient number of sizes, and in the construction shown there is illustrated a series of chutes 31 to 36 to accommodate six different sizes, it being understood that the chutes carry the peas to any suitable separate receptacles. These chutes are preferably supported on a frame which conforms to the curvature of the outer cylindrical member and is supported by a pair of bars 39 which encircle the sleeves 13 at 40. Also mounted on the frame is an adjustable stop 41 engageable with the standard 42, while 43 is a spring acting to retain the chute frame in adjusted position. By adjusting the stop 41 in the lug 44 in which it is threaded, the chute frame may be swung in one direction or the other to vary the sizes received in the different chutes, as may be desired at different seasons of the year or for different sized articles.

Reference has heretofore been made to the small slots or openings 10 at the base of each pocket 9, and these are for the purpose of admitting a spray of water which may be desirable and is effective to insure dislodging the peas, and their discharge at the proper points as well as cleaning the machine and preventing any clogging. To accomplish this, the central hollow shaft 3 is provided at its lower portion in approximate line with the segmental zone where the peas are discharged, with a series of small openings 46, and 47 is a pipe or hose for leading water under pressure to the interior of the pipe 3 where it is discharged through the openings 46 downwardly and laterally to the left, as shown in Fig. 3, where it passes out through the slots 10 and effectively removes the peas from the pockets and forces them outwardly into the proper chutes.

While the invention has been described with reference to a particular structural embodiment, it is not restricted to the details or arrangements herein disclosed, and this application is intended to cover such other modifications or changes as may come within the purposes of the invention or the scope of the following claims.

I claim:

1. A grading mechanism comprising a pair of cylindrical drums arranged concentrically in juxtarelation to each other and rotatable in the same direction at different uniform speeds, the outer of said drums having a series of closely arranged discharge slots extending transversely therethrough and the inner of said drums having a series of closely arranged retaining pockets therein which are slightly wider at their outer edges than said discharge slots and coextensive in length therewith.

2. A grading mechanism comprising a pair of cylindrical drums arranged concentrically in juxtarelation one within the other, the outer drum having a series of closely arranged longitudinal slots extending transversely therethrough and the inner drum having a series of closely arranged retaining pockets therein coextensive in length with said slots, the outer drum having a greater number of slots than the inner drum has pockets, and means for rotating the drums in the same direction at angular velocities which are inversely as the number of slots and pockets respectively contained therein.

3. A grading mechanism comprising a pair of cylindrical drums arranged concentrically in juxtarelation one within the other, the outer drum having a series of closely arranged longitudinal slots extending transversely therethrough and the inner drum having a series of closely arranged retaining pockets coextensive in length with said slots, and means for rotating said drums in the same direction at different speeds causing one of said pockets of the inner drum to be positioned directly opposite a slot of the outer drum twice during each complete rotation.

4. A grading mechanism comprising a pair of cylindrical drums arranged concentrically in juxtarelation one within the other, the outer drum having a series of slots extending transversely therethrough of a width equal to the maximum size to be graded, said slots being separated by bars of approximately the same width as the slots, the inner drum having a series of retaining pockets coextensive in length with said slots, the pockets at their outer edges being of slightly greater width than said slots and the surfaces on the inner drum between said pockets being of slightly less width than said pockets, and means for rotating the inner drum in the same direction as and at a slightly greater speed than the outer drum and both drums at uniform speeds.

5. A grading mechanism comprising a pair of cylindrical drums arranged concentrically in juxtarelation one within the other, the outer drum having a series of slots extending transversely therethrough and of a width equal to the maximum size to be graded, said slots being separated by bars having approximately the same width as the slots, the inner drum having a series of retaining pockets coextensive in length with said slots and of a width at their outer edges slightly greater than the slots, the pockets being separated by surfaces on the inner drum of slightly less width than the pockets, the number of slots in the outer drum being greater than the number of pockets in the inner drum, and means for rotating the drums in the same direction at angular velocities which are inversely as the number of slots and pockets respectively contained therein.

6. A grading mechanism comprising a pair of cylindrical drums arranged concentrically in juxtarelation one within the other, the outer drum having a series of slots extending transversely therethrough and of a width equal to the maximum size to be graded, said slots being separated by bars having approximately the same width as the slots, the inner drum having a series of retaining pockets coextensive in length with said slots and of a width at their outer edges slightly greater than the slots, the said retaining pockets being separated by surfaces on the inner drum of slightly less width than the pockets, and means for rotating the inner drum in the same direction as and at a slightly greater speed than the outer drum causing each retaining pocket of the inner drum to be covered and uncovered by a bar of the outer drum twice during each complete rotation.

7. A grading mechanism comprising a pair of cylindrical drums arranged concentrically in juxtarelation one within the other, the outer drum having a series of slots extending transversely therethrough of a width equal to the maximum size to be graded, said slots being separated by bars having approximately the same width as the slots, the inner drum having a series of retaining pockets coextensive in length with said slots and slightly wider at their outer edges than the slots, the pockets being separated by surfaces on the inner drum of slightly less width than the pockets, the number of slots in the outer drum being greater than the number of pockets in the inner drum, and means for rotating the drums in the same direction at angular velocities which are inversely as the number of slots and pockets respectively contained therein, causing each of said pockets of the inner drum to be covered and uncovered by a bar of the outer drum twice during each complete rotation.

8. A grading apparatus comprising a pair of cylindrical rotary drums arranged one within the other, the peripheral face of the inner of said drums being provided with a plurality of article holding recesses, and the outer of said drums being provided with a plurality of apertures registerable with said recesses for the introduction and discharge of articles into and from said recesses, and means for driving said drums in a common direction and at uniform but different speeds to cause said apertures to move successively into and out of registry with said recesses.

9. A grading apparatus comprising a pair of cylindrical rotary drums arranged one within the other, the peripheral face of the inner of said drums being provided with a row of article holding recesses extending around the drum, and the outer of said drums being provided with a plurality of apertures extending therearound and registerable with said recesses for the introduction and discharge of articles into and from said recesses, the number of apertures in the outer drum being different from the number of recesses in said inner drum, and means for driving said drums in a common direction and at different uniform speeds proportional to the ratio between the number of pockets and the number of apertures.

10. A grading apparatus comprising a pair of cylindrical rotary drums arranged one within the other, the peripheral face of the inner of said drums being provided with a plurality of article holding recesses, and the outer of said drums being provided with a plurality of apertures registerable with said recesses for the introduction and discharge of articles into and from said recesses, and means for driving said drums in a common direction and at uniform but different speeds to cause said apertures to move successively into and out of registry with said recesses twice during each revolution of the outer drum.

JOHN R. PELLAM.